United States Patent [19]

Harper et al.

[11] 3,746,311
[45] July 17, 1973

[54] MULTI-STAGE MIXING DEVICE

[75] Inventors: Robert C. Harper, Loveland; G. W. Creeden, Milford; Victor G. Soukup, Cincinnati, all of Ohio

[73] Assignee: Cincinnati Milacron, Inc., Cincinnati, Ohio

[22] Filed: June 20, 1972

[21] Appl. No.: 264,603

[52] U.S. Cl. .................................. 259/7, 259/65
[51] Int. Cl. .............................................. B01f 7/08
[58] Field of Search ........................ 259/7, 8, 9, 10, 259/6, 21, 22, 23, 24, 42, 43, 44, 65, 66, 67

[56] References Cited
UNITED STATES PATENTS

| | | | |
|---|---|---|---|
| 2,977,098 | 3/1961 | Watson | 259/7 |
| 3,026,183 | 3/1962 | Cole | 259/7 |
| 3,286,992 | 11/1966 | Armeniades | 259/4 |
| 3,450,388 | 6/1969 | Stump | 259/8 |
| 3,559,955 | 2/1971 | Wydeveld | 259/8 |
| 3,661,363 | 5/1972 | Aletti | 259/7 |

Primary Examiner—Robert W. Jenkins
Attorney—A. J. Mangels and H. T. Keiser

[57] ABSTRACT

A mixing device having a plurality of mixing zones arranged in series, at least one of the mixing zones comprising a turbulent mixer of generally tubular conformation having a plurality of turning elements positioned therewithin and which is adapted to rotate as an entirety. At least one other mixing zone comprises a rotatable, shear mixing device incorporating a pair of relatively rotatable, cylindrical elements positioned one within the other and at least one of which has a helically disposed groove on a surface opposite the cooperating surface of the other cylindrical element. The serially arranged mixing sections provide improved mixing action to assure homogeneity of the resulting mixture and the use of turbulent mixing as one section of the mixing device assures that the product will not be unduly overheated due to excessive shear mixing.

9 Claims, 4 Drawing Figures

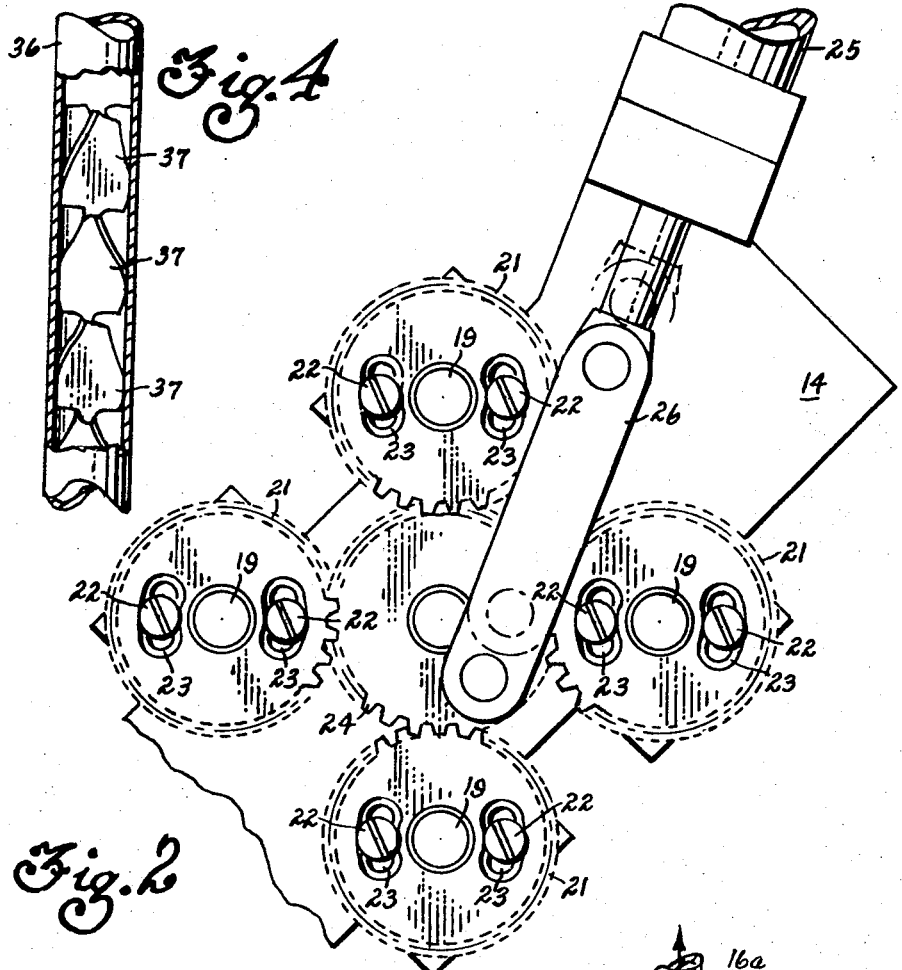
Fig. 4
Fig. 2
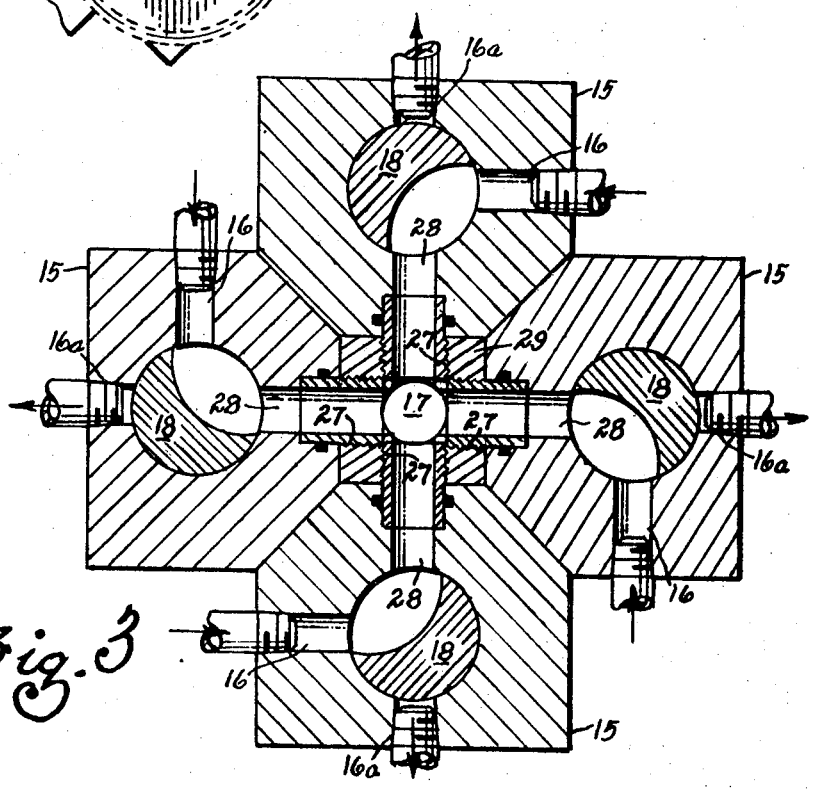
Fig. 3

MULTI-STAGE MIXING DEVICE

BACKGROUND OF THE INVENTION

This invention relates to mixing devices and more particularly to rotatable mixing devices having a plurality of mixing sections serially arranged to provide improved homogenity in the mixed product.

The use of shear mixers to mix multi-component fluids is well-known. A particular type of shear mixer employing relatively rotatable cylindrical elements wherein one of the elements is a cylindrical impeller which rotates within a closely fitting cylindrical barrel is shown in U.S. Pat. No. 3,559,955, which issued Feb. 2, 1971, to Lucas J. Wydeveld. The type of mixer disclosed in the Wydeveld patent is particularly suited for mixing the constituents of polyurethane foam compositions and the mixing device of the present invention is also well suited for that use. In the Wydeveld device, however, only a single mixing section is employed and in order to insure homogeneity of the resulting mixture, the device must be operated at a relatively low flow or throughout rate to insure adequate residence time of the material in the device to permit the material to be intermixed to the degree necessary to insure acceptable foamed products.

In order to increase the output of a mixer such as that shown in the Wydeveld patent, it would be necessary to increase the flow rate of the material supplied to the mixer. However, when the flow rate is increased the impeller speed must be increased to maintain mixing; but even with increased impeller speed at an increased flow rate, mixing is inadequate because of the short residence time of material in the mixer. Furthermore, in increasing the impeller speed, additional work is done on the fluid, thereby increasing its temperature, which is undesirable when polyurethane foam materials are being intermixed because the increase in temperature could activate the foaming agent and cause foaming to take place within the mixer itself rather than in the mold into which the output of the mixer is supplied.

In mixing multicomponent systems it oftentimes is quite critical to assure that the ratio of the several constituents is maintained at a substantial constant level in order to insure suitable foamed products. For example, if one or more of the constituents is present in a greater or less degree it may be possible that the physical properties of the resultant molded article are incorrect in that the foamed material may be too soft, contain void spots, or the like. Thus it is necessary that the metering of the several streams of constituents be critically controlled and that provision be made for compensating for differences in viscosity and pressure of the several fluids to assure a continuous and predetermined rate of flow of the several components, both upon start-up and also during the operation of the device. Although it has been suggested in the past that the several component inlet valves be operated from a common actuator to insure the correct ratio of the several constituents, it has not heretofore been possible to make during startup correction for slight physical differences in one or more of the constituents, which because of change in viscosity or pressure may flow at a different rate and which rate may tend to alter the ratio of one or more of those constituents to another in the final mixture, with possibly deleterious results in the molded products.

The present invention is intended to overcome the above-described difficulties by providing a multiple zone mixing device which does not excessively overheat the intermixing materials and which includes provisions for adjusting the input quantities of constituents for differences in conditions of the individual streams, to assure a desired ratio of the several constituents and to thereby provide improved quality products.

SUMMARY OF THE INVENTION

Briefly stated, in accordance with one aspect of the present invention, a multiple zone mixing device is provided which includes at least two serially arranged mixing zones, one of which comprises a tubular member having a plurality of serially arranged turning elements therein and which tubular member is adapted to be rotated as the material to be mixed is passed therethrough, and a second mixing zone downstream of the first and which is adapted to impart shearing forces to the material passing therethrough to intimately intermix the same. The second mixing zone preferably comprises a pair of relatively rotatable cylindrical elements, one of which is adapted to be positioned within and concentric with the other to provide a shear gap therebetween through which the materials to be mixed must flow.

BRIEF DESCRIPTION OF THE DRAWINGS

FIG. 2 is a top view of the mixing device shown in FIG. 1.

FIG. 3 is a cross-sectional view taken along the line 3—3 of FIG. 1.

FIG. 4 is a fragmentary view of one of the mixing elements, partially broken away to show the internal structure thereof.

DESCRIPTION OF THE PREFERRED EMBODIMENT

Figure 1:
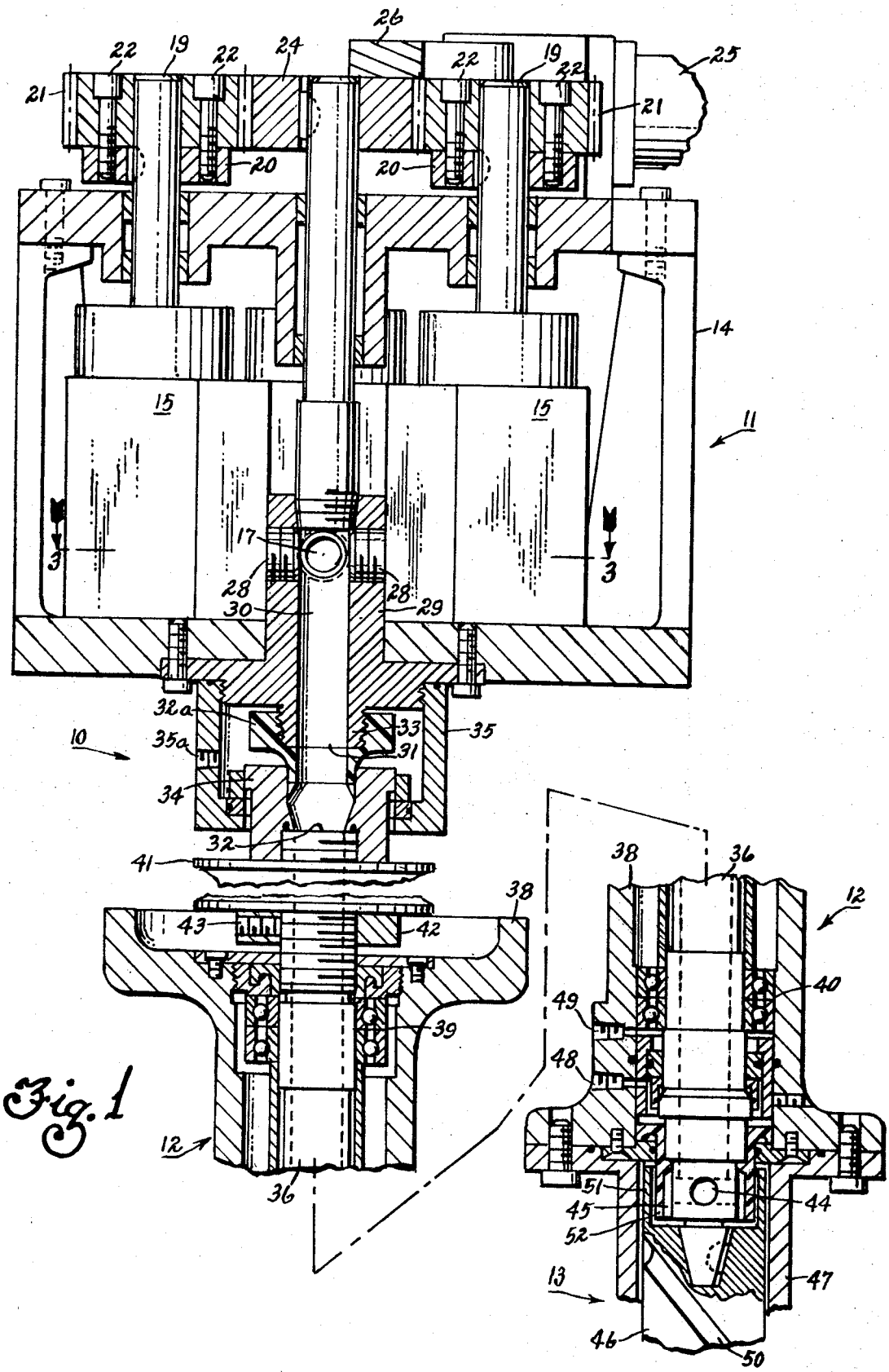
FIG. 1 is a cross-sectional view partially broken away, showing the several elements of the mixing device of the present invention in their operative relationship.

Referring now to the drawing and particularly to FIG. 1 thereof, there is shown in assembled form the mixing device 10 of the present invention. The device 10 includes a material inlet section 11, a first mixing section 12 and a second mixing section 13.

Material inlet section 11 comprises a housing 14 which carries a plurality of three way valves 15, each of which is connected to a source (not shown) of the fluid components to be intermixed. Each of valves 15 includes inlet ports 16 arranged to discharge through outlets 28 into a chamber 17 or, alternatively, to outlet ports 16a (see FIG. 3) which are arranged to return the materials to their respective sources to provide a recirculation path. The arrangement of the several valves 15 and their relationship to chamber 17 are clearly shown in FIG. 3, which also illustrates the material inflow and outflow paths. As shown, the several valve members 18 are arranged to permit the flow of the several components into the chamber 17. Upon rotation of each valve member 18 counterclockwise 90°, each of the materials will be recirculated back to its respective source (not shown).

Referring once again to FIG. 1, valve member 18 in each of valves 15 is actuated by means of a shaft 19 connected thereto and which extends through the top of housing 14. Each shaft 19 includes a drive disc 20 which is keyed thereto to permit it to rotate together with the shaft. Positioned above drive disc 20 and concentric with shaft 19 is a drive gear 21, which loosely surrounds and is capable of relative rotation with shaft 19. Drive gear 21 is coupled to drive disc 20 by means of a pair of bolts 22 which extends through drive gear 21 and into drive disc 20. As shown more clearly in FIG. 2, the circumferential position of drive gears 21 can be adjusted by virtue of arcuate slots 23 formed therein and through which connecting bolts 22 pass to permit drive gears 21 to be circumferentially displaced and positionally adjusted with respect to drive discs 20 when connecting bolts 22 are loosened. Each of drive gears 21 of the valves 15 is driven by a central pinion 24 which is rotated through a portion of a revolution by means of an hydraulic cylinder 25 and link system 26. Thus, each of the several valves 15 is operable simultaneously with each of the others, although by virtue of the relative positioning between the several drive gears 21 and their respective drive discs 20, the opening time and extent of opening of the several valves can be varied with respect to those of the other valves. Consequently, adjustment of the angular position of valve members 18 can be effected to compensate for the pressure or viscosity of one or more of the incoming constituents to assure the desired ratio between the several constituents in the final mixture.

Chamber 17 into which the several valves 15 convey the constituents of the mixture is so arranged that the several incoming streams impinge upon one another to provide an initial degree of mixing therebetween. As shown in FIG. 3, chamber 17 can include a plurality of threaded inserts 27 adapted to provide communication between the respective valve outlets 28 and the interior of chamber 17. If desired, inserts 27 can include flow control orifices (not shown) or restrictions to control the pressure of one or more of the constituents.

Referring once again to FIG. 1, chamber 17 is formed in a tubular element 29 which can be connected to the base of housing 11. A passageway 30 extends from chamber 17 to an outlet 31 which is in communication with the inlet 32 of first mixing section 12. The connection between outlet 31 of tubular element 29 and inlet 32 of first mixing element 12 is sealed by means of a flexible sealing member 32a which can be made, for example, from Teflon and which is threadedly engaged in a boss 33 at outlet of tubular element 29. Sealing member 32a cooperates with an annular member 34 threadedly engaged with inlet 32 of first mixing section 12. The entire seal area is enclosed by a housing 35 into which a pressurized sealing fluid can be introduced through an aperture 35a to prevent leakage of the multicomponent mixture and its contact with air. Preferably, the sealing fluid, which can leak into the mixture, is one of the minor constituents of the fluids which are mixed together and is preferably non-reactive with air. The sealing fluid can be, for example, a stabilizer, a fire retardant, or the like, which is intended to be present in the mixture in a small amount.

First mixing section 12 comprises a tubular member 36 open at both ends and within which are positioned a plurality of turning elements 37 as more clearly shown in FIG. 4. Turning elements 37 serve to separate the flow and permit its subsequent recombination and also to turn the flow to impart rotation to it and thereby induce turbulence to cause the several constituents to intimately intermix. When mixing section 12 is rotated at high speed, turning elements 37 also impart a chopping action to the fluid being intermixed. The tubular mixing element can be of the type shown and described in U.S. Pat. No. 3,286,992, which issued Nov. 22, 1966, to C. D. Armeniades et al. The several turning elements 37 in first mixing section 12 can each be adapted to turn the flow in the same direction, i.e., clockwise or counterclockwise, or they can be adapted to alternately turn the fluid in opposite directions to further increase the mixing action. Furthermore, the several turning elements 37 can be connected or they can be separated, but in any event they are suitably attached to the interior of tubular member 36 in such a manner as to preclude relative rotation therebetween.

Tubular member 36 is rotatably positioned within a housing 38 by means of bearings 39, 40 to permit relative rotation therebetween. The rotation can be imparted by means of a pulley 41 which is adapted to rotate with tubular member 36 by means of a threaded nut 42 which securely holds pulley 41 and urges it against annular member 34. Nut 42 can be fixed in position by means of a set screw 43, if desired. Pulley 41 is adapted to be driven by means of, for example, a belt (not shown) which is, in turn, drawn by an electric or an hydraulic motor. Alternatively, if desired, the tubular mixing device could be enclosed within the armature of an electric motor to reduce the space requirement of the device. A similar arrangement can be constructed utilizing an hydraulic motor.

The outlet 44 of tubular member 36 communicates with the inlet 45 of second mixing section 13, which includes a pair of relatively rotatable cylindrical elements one of which, impeller 46, is connected to tubular member 36 and is caused to rotate therewith. Impeller 46 is adapted to rotate within a closely fitting cylindrical housing 47 which is attached to housing 38 within which tubular member 36 rotates. Housing 47 can include a suitable discharge opening (not shown) to permit the mixed material to be dispensed into, for example, a mold. In order to prevent the mixed material from leaking from the intersection between the outlet of the first mixing section 12 and the inlet to the second mixing section 13, a pressurized sealing fluid can be introduced through aperture 48 and vented through passage 49 in order to confine the material to the interior of the device 10. The pressurized sealing fluid is preferably one of the components of the mixture and can be, for example, one of the minor components of the mixture such as a fire retardant, a stabilizer, or the like, and serves to prevent the contact of air with the mixture.

Impeller 46 in second mixing section 13 can include one or more peripheral grooves 50 to pump the mixed fluid from inlet 45 to second mixing section 13 to the outlet (not shown). Alternatively, housing 47 can have one or more peripheral grooves on its inner surface ad disclosed in copending application Ser. No. 98,277, filed Dec. 15, 1970, by R. C. Harper, and entitled "Mixing Device," the entire disclosure of which is hereby incorporated by reference herein.

Second mixing section 13 can comprise a plurality of mixing sections one of which is an annular basket 51 formed in rotatable impeller 46 and the walls of which have apertures therein to permit the material to pass therethrough and into the space between housing 47 and impeller 46. By so constricting the flow while the material is flowing both radially and circularly as it enters basket 51 provides improved mixing results. Further mixing can be provided by interposing a stationary perforated baffle 52 between rotating basket 51 and rotary inlet 45. If desired, baffle 52 can be combined with a fluid seal as shown, and formed from a resilient material to permit sealing between the first and the second mixing sections and simultaneously to further improve the mixing action of the latter by interposing a second perforated element in the path of flow.

In operation, the various constituents of the ultimate mixture are each individually supplied to one of the several valves 15 positioned at the top of the device for conveyance to chamber 17. The pressure and velocity of any of the constituents can be varied by inserting an orifice in the threaded insert 27 (FIG. 3). Altering the positional relationship between the drive gear 21 and the corresponding drive disc 20 for any particular valve can influence the relative timing of entrance of the several streams of constituents to compensate for pressure or viscosity differences and insure a substantially constant ratio of constituents from start up to steady state operation.

Upon entering chamber 17, the fluids impinge upon one another, as a result of which some preliminary mixing occurs. Thereupon, the mixture flows downwardly into the first mixing section 12, which is of the turbulent mixing type and which is continuously rotated. As the material passes through first mixing section 12 it is continuously separated and recombined and turned while simultaneously being rotated as a result of the rotation of tubular element 36.

After passing through first mixing section 12, the fluid is discharged radially therefrom through outlet 44 and into basket 51 of second mixing section 13. If baffle 52 is present, the material also divides while passing through baffle 52 and subsequently recombines prior to passing through the apertured wall of basket 51 whereupon it is again divided and is later recombined in the space between impeller 46 and housing 47. In the course of traveling between imepller 46 and housing 47 the material is subjected to shearing forces which further tend to intimately intermix the several constituents of the mixture. The material is then pumped to the outlet of housing 47 by means of one or more helical grooves 50 formed in the outer surface of impeller 46. If desired, grooves can also be formed on the inner surface of housing 47 to cause a recirculation effect, which will add further to the mixing action.

It can thus be seen that there are several points within the device where mixing occurs. First of all, the impingement of the fluids upon each other in chamber 17 causes some initial degree of mixing. Secondly, first mixing section 12 intermixes the constituents by means of turbulent mixing. Thirdly, baffle 52 can be positioned at the outlet of first mixing section 12 to cause further flow division and recombination. Fourthly, the mixture is subjected to shearing forces in second mixing section 12 in order further to cause the mixture to become as homogeneous as possible.

While particular embodiments of the invention have been illustrated and described, it will be apparent to those skilled in the art that various changes and modifications can be made and it is intended to cover in the appended claims all such changes and modifications that are within the scope of this invention.

What is claimed is:

1. A multiple zone mixing device having at least two serially arranged mixing zones, said device comprising:
    a. a tubular member defining a first mixing zone and having an inlet end and an outlet end spaced therefrom, said tubular member including a plurality of turning elements serially positioned therewithin between said inlet end and said outlet end for alternately dividing the material to be mixed into a pair of streams and permitting the streams to recombine, for simultaneously imparting an angular velocity component to said material;
    b. a second mixing zone in serial relationship with said tubular member; and
    c. means for rotating said tubular member around a longitudinal axis to impart additional rotation to the material passing therethrough, thereby enhancing the mixing action.

2. The device of claim 1, wherein said rotating means encloses a portion of said tubular member.

3. The device of claim 2 wherein the tubular member is the drive shaft of the rotating means.

4. The device of claim 1 wherein said second mixing zone comprises a rotatable basket and wherein said basket includes a plurality of radial apertures therein to cause separation and subsequent recombination of the material to be mixed.

5. The device of claim 4 wherein a perforated baffle is interposed between said basket and the point of introduction of said material thereto.

6. The device of claim 1, wherein said second mixing zone is a shear mixer which imparts shearing forces to the material passing therethrough.

7. The device of claim 6, wherein said shear mixer comprises a pair of relatively rotatable cylindrical elements, one of which comprises an impeller having at least one helical peripheral groove therein and the other of which comprises a housing surrounding said impeller and wherein the space between said housing and said impeller defines the shear mixing area.

8. The device of claim 6, wherein said shear mixer and said tubular member are mechanically connected to permit simultaneous rotation.

9. The device of claim 1, including three serially arranged mixing zones the first two of which are of the turbulent mixing type and the last of which is of the shear mixing type.

* * * * *